3,366,677
LOW TEMPERATURE PREPARATION OF ETHANE-1-HYDROXY-1,1-DIPHOSPHONIC ACID
Oscar T. Quimby, Cincinnati, Ohio, assignor to The Procter & Gamble Company, Cincinnati, Ohio, a corporation of Ohio
Filed May 13, 1965, Ser. No. 455,567
7 Claims. (Cl. 260—502.4)

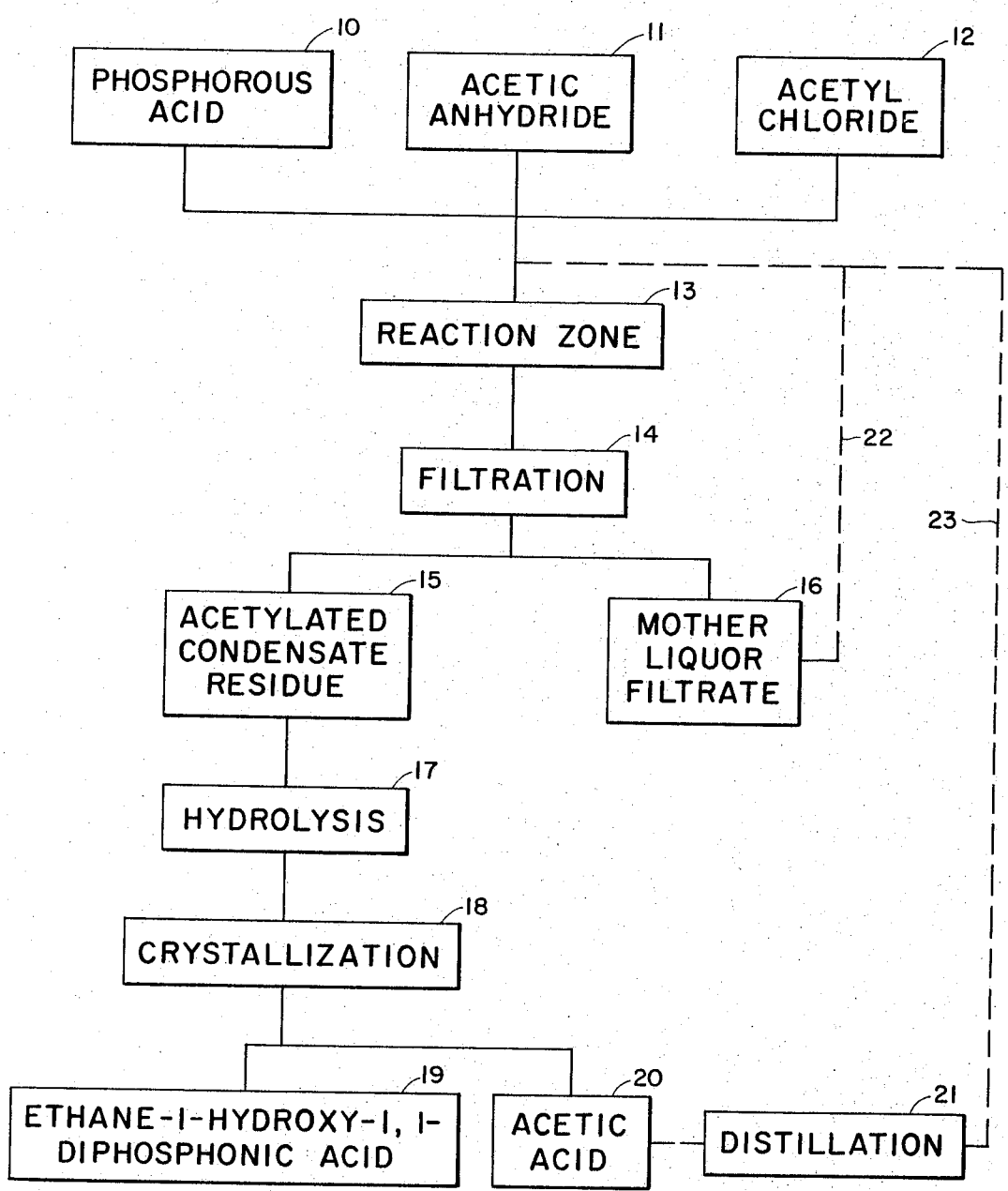

This invention relates to a process for preparing ethane-1-hydroxy-1,1-diphosphonic acid.

Ethane-1-hydroxy-1,1-diphosphonic acid has a formula of $CH_3C(OH)(PO_3H_2)_2$ and can be represented structurally as:

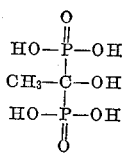

The compound has marked sequestering and chelating properties which make it valuable for such uses as water softening, prevention against and removal of scale build-up in boilers, wells and metal pipes of all sorts. More recently it has been discovered that salts of the acid, such as the alkali metal salts, are very good builder compounds for use in laundering and detergent compositions. Compositions of this latter type are described in U.S. Patent 3,159,581, dated Dec. 1, 1964.

There are several known reactions leading to the preparation of ethane-1-hydroxy-1,1-diphosphonic acid. One method described in the literature involves reacting phosphorous acid and acetyl chloride. Another known reaction starts with phosphorus trichloride and acetic acid. The above two systems are interchangeable, when used in 1:3 molar ratios of the respective reactants, since both equilibrate rapidly to an identical system.

Reference to processes and reactions for preparing ethane-1-hydroxy-1,1-diphosphonic acid are contained in the following sources: N. Menschutkin's work reported in Annalen d. Chemie, vol. 133, page 317 (1865); Hans von Baeyer and K. A. Hofmann's work reported in Chemica Berichte 30, 1973-1978 (1897); Benjamin T. Brooks' article entitled, "The Action of Phosphorus Trichloride on Organic Acids; Monoacetyl Phosphorous Acid" published in the Journal of the American Chemical Society, volume 34, 492-499 (1912); German Patent 1,010,965, dated May 8, 1956; German Patent 1,082,235 dated May 25, 1960; German Patent 1,072,346 dated Dec. 31, 1959; German Patent 1,107,207 dated May 25, 1961; British Patent 940,138 dated Oct. 23, 1963; and British Patent 978,297 dated Dec. 23, 1964.

It is an object of the present invention to provide a process for preparing ethane-1-hydroxy-1,1-diphosphonic acid, EHDP, which, while employing known reactants, constitutes an improved process in that it embodies a low temperature rearrangement of phosphite anhydride reaction intermediates to form an intermediate condensate which is easily hydrolyzable to the desired diphosphonic acid. It is another object of the present invention to provide an improved continuous process for preparing ethane-1-hydroxy-1,1-diphosphonic acid in which the conversion of the phosphorous reagent to said acid can be nearly quantitative. Other objects will become apparent from a careful reading of the following description of the present invention.

The drawing is a continuous flow chart depicting one embodiment of the present invention.

According to the present invention, the foregoing objects are obtained by a process which comprises the steps of preparing a reaction solution by mixing phosphorous acid, acetic anhydride and acetyl chloride or equivalent reactants as hereinafter fully described in which the molar proportions of these reactants are respectively in the range of from about 1:3:1 to about 1:8:5, respectively, and preferably from 1:4:1.5 to 1:7:4.6, heating said reaction solution to a temperature in the range of from about 30° C. to about 90° C. for a period of from about 5 minutes to about 9 hours until an acetylated intermediate condensate of ethane-1-hydroxy-1,1-diphosphonic acid is formed which precipitates out of the reaction solution, filtering said reaction solution to separate said acetylated intermediate condensate and to obtain a mother liquor filtrate composed of the remaining reaction solution, hydrolyzing said acetylated intermediate condensate by refluxing an aqueous solution thereof for a time period of from about 15 minutes to about 12 hours within a temperature range of from about 80° C. to about 170° C., the hydrolysis step resulting in the formation of a solution consisting essentially of free ethane-1-hydroxy-1,1-diphosphonic acid and acetic acid, and, thereafter, separating said ethane-1-hydroxy-1,1-diphosphonic acid from said acetic acid.

The initial reaction which results in the formation of the acetylated condensate of ethane-1-hydroxy-1,1-diphosphonic acid, has as a preferred temperature range from 50° C. to 80° C. The preferred reaction time is closely linked to the temperature being used, being 1 to 4 hours at 50° C. and 10 to 50 minutes at 80° C. Time periods for reaction temperatures between 50° C. and 80° C. will be within these time periods. The hydrolysis of the acetylated condensate to free EHDP acid has a preferred temperature in the range of 100° C. to 155° C., the preferred time being 3 to 6 hours at about 100° C., 15-30 minutes at about 155° C., with intermediate time periods between 100° C.-155° C. Stirring throughout each of the process steps is desirable but not absolutely essential.

It has been discovered that in the starting mixture of the reactants, derived from mixing phosphorous acid, acetic anhydride, and acetyl chloride, it is the acetyl chloride that provides anhydrizing power of sufficient intensity to drive to completion the rearrangement of intermediate phosphite anhydrides (P—H bonding) to final reaction products containing phosphorus bonded to carbon (P—C bonding). The phosphite-anhydride intermediates are those which contain phosphorus bonded to hydrogen, so-called P—H bonding; the desired final product requires phosphorus bonded to carbon, not hydrogen.

In the mixed anhydride reaction system of the present invention, the reactants are involved in a very complex set of interactions including one which demonstrates that phosphorus trichloride and acetic acid are fully equivalent reaction materials to phosphorous acid and acetyl chloride, respectively, as expressed by the following equation:

In other words, quite similar, and in some cases identical, reaction mixtures can be compounded from phosphorus trichloride, acetic anhydride, and acetic acid. Even when they differ somewhat, e.g., in ratio of chloride to hydroxyl or chloride to active hydrogens, the same solid acetylated condensate precipitates are formed as those prepared by reacting phosphorus acid, acetic anhydride and acetyl chloride. Thus, although the invention is primarily described as starting with phosphorous acid, acetic anhydride and acetyl chloride, it is pointed out that in its broader scope it contemplates alternatively the use of phosphorus trichloride in place of the phosphorous acid and acetic acid in place of acetyl chloride. The proportion requirements remain generally the same whether the phosphorus containing compound is used as phosphorous acid or the acid chloride or whether the acetyl compound is present as an acid or as an acid chloride.

Other reaction intermediate products formed during the complex reorganization are various acid anhydrides, whose formation is often accompanied by evolution of gaseous HCl.

The phosphorous element consumed in making the acetylated intermediate condensate comes from the phosphorous acid and/or phosphorus trichloride supplied to the reaction mixture. The acetyl group consumed in making said condensate comes partially from each of the carbon-containing reactants, namely, acetic anhydride, acetyl chloride and/or acetic acid.

Since the complete process yields less than one mole of recoverable anhydrous acetic acid per mole of phosphorus taken as phosphorous acid and/or phosphorus trichloride, all of this acetic acid, 20 in the drawing, after being freed from water by fractional distillation 21, can be returned 23 to the reaction zone 13 along with an equivalent amount of phosphorus trichloride, i.e., ⅓ mole $PCl_3$ for each mole of dry $CH_3COOH$. This makes up part of the deficit in phosphorous acid, 10, and acetyl chloride, 12, found in the mother liquor, 16. The mother liquor or filtrate, 16, obtained from the low temperature reaction and crystallization of the acetylated solid condensate, can also be returned to the reaction zone, 13. Final restoration of the original proportions chosen for the reaction mixture may require additional adjustments; (1) it may be necessary to add phosphorous acid, 10, in sufficient amount to correct any deficit in phosphorus content; (2) acetyl chloride may need to be added, 12, to correct any deficit in chloride content; and (3) it may also be necessary to add acetic anhydride 11, equal in amount to any deficit in that reagent.

By a continuous cyclic process as described above and outlined in the drawing, and which is subject to the conditions and operations described and illustrated herein, the overall yield of the continuous process is made high, i.e., 90 to 100 of the phosphorus taken gets converted to ethane-1-hydroxy-1,1-diphosphonic acid; the yield is lower for a batch process (single cycle), usually in the range of 60 to 75%.

In terms of the drawing, one embodiment of the present invention will be seen to include a step for preparing a reaction mixture of phosphorous acid, 10, acetic anhydride, 11 and acetyl chloride, 12.

In a continuous process the reaction mixture is passed to a reaction zone 13 where the reaction is conducted by heating the reaction mixture with continuous stirring. An acetylated condensate precipitate is formed during the reaction which is identified more fully elsewhere in this description of the invention. The reaction mixture is then filtered, 14, resulting in the separation of a residue of the precipitated acetylated condensate, 15, and a mother liquor filtrate, 16, comprised in part of starting materials and/or small amounts of intermediate reaction products. The residue 15 consisting of the acetylated condensate is hydrolyzed, 17, thereby forming a solution of free ethane-1-hydroxy-1,1-diphosphonic acid and acetic acid. The free ethane-1-hydroxyl-1,1-diphosphonic acid 19 can be separated and recovered from the acetic acid by crystallizing it, 18, out of the acetic acid solution 20 and filtering the resulting mixture.

There is provision made in the process depicted in the drawing for recycling the mother liquor, 16, and the acetic acid, 20, back to the reaction mixture in zone 13 via lines 22 and 23. In the case of the acetic acid 20, it may be necessary to distill off any water present, 21. Subsequently each mole of acetic acid must be mixed with one-third of a mole of phosphorus trichloride. As indicated earlier the acetic acid and the phosphorus trichloride react to form the original reactants, phosphorous acid, 10, and acetyl chloride, 12.

A critical feature of the present invention is the discovery that the reaction is directed by the crystallization of solid acetylated condensate during the described heating or reaction step. The exact composition of this intermediate product has not been determined due to the extremely complex nature of the reaction system. The intermediate has been characterized, however, with a fair degree of certainty, as being an intermediate acetylated condensate of ethane-1-hydroxy-1,1-diphosphonic acid. It is surprising that this intermediate acetylated condensate forms and precipitates so rapidly at such low temperatures, i.e., in the reaction temperature range of about 30° C. to about 90° C. The precipitate formed during the reaction step is referred to hereinafter as the acetylated condensate. The acetylated condensate can be recovered from the filtration step 14 by any convenient manner. One suitable means which has been successfully employed is to simply filter the reaction solution and wash the recovered precipitate with ethyl ether.

According to a preferred embodiment of the present process, the mother liquor filtrate 16, obtained from the reaction solution has been found to contain varying amounts of acetyl chloride, acetic anhydride, minor amounts of phosphite present mostly as acetylated phosphites, and small amounts of various carbon-phosphorus bonded compounds, all of which, as mentioned previously, can be recycled directly back to the initial reaction mixture. This offers the unique feature of an economic and efficient continuous process in which the unused portion of the starting reactants is efficiently recycled back to the initial reaction mixture. The recycled stream of reactants (i.e., the mother liquor 22, and the recovered dry acetic acid 23) can be readily adjusted so that the necessary molar proportion of the reactants will be in the necessary range described above. For example, phosphorous acid with an appropriate amount of phosphorus trichloride can be used to compenate for the recycled dry acetic acid and to replenish the phosphorous species. A batch reaction process can thus be readily converted into a continuous one, in which only the desired ethane-1-hydroxy-1,1-diphosphonic reaction product is removed from the reaction system. All of the other reagents can be recycled and used as starting materials. A primary advantage of this embodiment of the present invention which distinguishes this process from known processes for preparing ethane-1-hydroxy-1,1-diphosphonic acid is the virtually quantitative conversion of the phosphorous reactant to the desired acid.

From the foregoing discussion it will be apparent that a recycling process using the conditions and procedures outlined herein will produce about 1 mole of ethane-1-hydroxy-1,1-diphosphonic acid for each mole of acetyl and each two moles of phosphorus consumed.

The hydrolysis step 17 of the separated acetylated condensate of ethane-1-hydroxy-1,1-diphosphonic acid 15 embodies an important discovery of the present invention because of the ease of hydrolyzing this particular condensate to ethane-1-hydroxy-1,1-diphosphonic acid. The important discovery is that the solid acetylated condensate made according to the present invention, that is under conditions of a reaction temperature of from 30° C. to 90° C. in a medium rich in anhydride (added as acetic anhydride) and in anhydride formers (added as acetyl chloride or phosphorus trichloride) hydrolyzes much faster than a cyclic tetraphosphonic acid condensate made at higher temperatures (120° to 155° C.) by a reaction mixture of acetic anhydride and phosphorous acid in 1:1 molar ratio. There was no known reason to expect this phenomenon to occur nor is any explanation of its occurrence yet apparent in the art.

The hydrolysis step is not limited to any specific method. Several alternative methods are described below and the one can be selected which best meets the specific needs of a given situation. For example, hydrolysis of the acetylated solid condensate can be performed simply by refluxing the solution by adding water, roughly 6 cc. of water for each gram of solid and heating to the boiling point. One useful sequence involves distilling the refluxed solution to remove water and acetic acid. If the amount of water remaining in the mixture becomes too low before the acetic acid content reaches a desired level, more water can be added to the mixture and the distillation continued. After the acetic acid content becomes negligible, the distillation is continued until the water content of the liquid in the pot is in the range of about 10 to 15%. The resulting syrupy liquid is then allowed to crystallize as described below.

A second alternative hydrolysis sequence involves an intermediate step: after the acetic acid has been distilled out, water can be added if necessary and the solution maintained under reflux until analysis shows that substantially all of the phosphorus is present in the form of ethane-1-hydroxy-1,1-diphosphonic acid; water is then distilled until the water content is reduced to about 10–15%.

Yet another suitable hydrolysis sequence involves a steam distillation step with superheated steam, the hydrolyzing mixture of the acetylated solid and water being jacketed so as to maintain said mixture at a temperature of 120° C. to 170° C., preferably in the range of 135° C. to 155° C. In this case, only a limited amount of water need be added initially to the acetylated solid condensate, e.g., 1 to 2 cc. per gram of solid. The acetic acid liberated during such hydrolysis distills over with the steam. Thereafter, flow of the superheated steam is continued until substantially all of the phosphorus is present as the desired ethane-1-hydroxy-1,1-diphosphonic acid as shown, for example, by $P^{31}$ MR analysis. The flow of the superheated steam is stopped at this point and if the water content of the hydrolyzed solution exceeds 10–15%, it is reduced to this level by evaporation of water from the solution.

Still another hydrolysis sequence involves the use of approximately the amount of water needed to convert the said acetylated solid condensate completely to ethane-1-hydroxy-1,1-diphosphonic acid. This procedure usually requires the use of a solvent. The necessary amount of water can be easily calculated from the amount of reactants being used. The preferred solvent is acetic acid used at a level of 3 to 10 cc. acetic acid per gram of the solid acetylated condensate. Such hydrolysis can be carried out at total reflux, which is initially in the range 110° C. to 120° C., but rises, as the hydrolysis proceeds, to temperatures of 120° C. to 130° C., the exact refluxing temperature at any time depending on the rate of heating. The refluxing is continued until substantially all of the phosphorus is in the form of ethane-1-hydroxy-1,1-diphosphonic acid, as shown by $P^{31}$ MR analysis.

Another important discovery is that the solid acetylated condensate can be dissolved in water and partially or completely neutralized, before hydrolysis, to a salt of ethane-1-hydroxy-1,1-diphosphonic acid. The other cyclic tetraphosphonic acid condensate mentioned above is very slow to hydrolyze at pH 5 and 100–103° C. and becomes substantially permanently stable at pH values of about 10 or higher at 100–103° C. If the hydrolysis of the acetylated solid condensate is done at pH 5, the liberated acetic acid can still be recovered by distillation; if done at much higher pH, the acetate can be recovered by methanol leaching of the dried hydrolysate and the sodium salt converted to acetic acid before returning to the reaction zone 13.

To hydrolyze partially neutralized solutions of the acetylated solid condensate, the pH of its aqueous solution is first adjusted to 5 with sodium hydroxide and the liberated acetic acid removed by one of the distillation procedures outlined in the foregoing paragraphs. The hydrolysis is then continued, e.g., via the superheated steam procedure described previously, until $P^{31}$ MR analysis shows substantially all of the phosphorus to be present as the disodium salt of ethane-1-hydroxy-1,1-diphosphonic acid. The salt can be recovered by evaporating the water or by crystallization as described later.

Before hydrolysis of fully neutralized condensate, the acetylated solid condensate is dissolved in water and fully neutralized by raising the pH to 11 by adding sodium hydroxide. Extra sodium hydroxide equal to 0.25 to 1.0 times the amount for neutralization is then added. Hydrolysis is then accomplished either by boiling this highly alkaline solution or by subjecting it to the superheated steam distillation procedure described previously for hydrolysis of the acid solution. In either case, the operation is continued until analysis, e.g., by $P^{31}$ MR analysis, shows substantially all phosphorus to be present as the tetrasodium salt of ethane-1-hydroxy-1,1-diphosphonic acid, i.e., a quartet at about −19 p.p.m. and a $PCH_3$ coupling constant of 14 cps. The tetrasodium salt is recovered by evaporating water and dissolving the sodium acetate and excess of sodium hydroxide by methanol leaching of the dried solids.

To crystallize the ethane-1-hydroxy-1,1-diphosphonic acid as a monohydrate from the aqueous syrups containing 10 to 15% water, it is only necessary to cool them to room temperature. The process can be speeded by seeding with a small amount of the monohydrate crystals as soon as the syrup has cooled to 70° C. or less. The crystals can be recovered by filtration, freed of mother liquor by washing with a water-miscible solvent which does not dissolve significant amounts of the monohydrate; acetone has been found satisfactory for this purpose when heat is not applied (discolors at elevated temperatures). Dioxane is also effective for this purpose, but lower alcohols, e.g., methanol or ethanol, dissolve too much of the monohydrate. After evaporation of the washing solvent, preferably under a vacuum, the residue can be added to the mother liquor and the water content again reduced to the range of 10% to 15%, so that a second crop of the monohydrate can be obtained by the process discussed in the previous paragraph; this process can be repeated as many times as is necessary to recover substantially all of the ethane-1-hydroxy-1,1-diphosphonic acid.

To recover ethane-1-hydroxy-1,1-diphosphonic acid from the acetic acid after the hydrolysis with approximately the theoretical amount of water in a large volume of acetic acid as solvent, the solution is cooled to near room temperature. The anhydrous ethane-1-hydroxy-1,1-diphosphonic acid crystallizes and settles out. Crystallization can be initiated by seeding with a small amount of anhydrous ethane-1-hydroxy-1,1-diphosphonic acid crystals, when the temperature is below 50° C.

To crystallize the disodium salt of ethane-1-hydroxy-1,1-diphosphonic acid from the aqueous solution of the hydrolysate whose preparation was described previously, water should be evaporated until the water content is in the range of 35 to 50% and then cooled to room temperature. The crystals can be filtered off, washed, if desired, with an ethanol/water mixture in a 40:60 volume ratio. The ethanol and water are evaporated from the combined filtrate and washings until the solution once more has a water content of about 35 to 50%. This step can be repeated until substantially all of the disodium salt of ethane-1-hydroxy-1,1-diphosphonic acid has been recovered.

*Example I*

A reaction mixture was prepared by combining 300 g. (3.66 mols) phosphorous acid, 2610 g. (25.60 mols) acetic anhydride and 660 g. (8.41 mols) acetyl chloride. While being stirred mechanically, it was heated to 50° C.±2° C. and held at 50° C. for two hours. A precipitate formed which was recovered by filtering the solution. The yield of ether-washed and dried solid acetylated condensate recovered was 311 g. and contained about 74% of the phosphorus put into the reaction mixture as phosphorous acid.

About 75 g. of the above solid were hydrolyzed by dissolving it in 310 cc. of water and subjecting it to steam distillation at atmospheric pressure for three hours; 12.35 g. of $CH_3COOH$ were recovered in the distillation as determined by titration with standard base. The hydrolysate was then neutralized to about pH 9 with aqueous 50% NaOH and the solution freeze-dried. The product was a white solid weighing 75 g.; it was further purified by five successive leachings with ethanol, which left a product weighing 71.5 g. The ethanol-leached product contained 17.2% water, 0.9% chloride as sodium chloride, and 5.2% acetate as sodium acetate. By $P^{31}$ MR analysis of an aqueous solution, 65-75% of its phosphorus was present as the trisodium salt of ethane-1-hydroxy-1,1-diphosphonate (quadruplet at delta=—19.6 p.p.m. relative to 85% $H_3PO_4$ as 0.0 with coupling constant of about 14 cps.); the remainder being the salt of an incompletely hydrolyzed condensate (unresolved multiplet at delta=—17 p.p.m.). By proton magnetic resonance, a similar distribution was indicated by a triplet at tau=8.4 to 8.5 p.p.m. with J=14 cps. and a singlet at tau=7.9 to 8.1 p.p.m. relative to tetramethylsilane protons at tau=10.0 p.p.m.

This product was tested for calcium sequestering efficiency at 25° C. by the method of Irani and Callis, J. Phys. Chem. 64, 1398 (1960), as a function of pH.

| pH of test: | g. Ca/100 g. anhyd. salt |
|---|---|
| 8 | 2.9 |
| 9 | 7.4 |
| 10 | 12.4 |
| 11 | 15.2 |
| 12 | 15.4 |

Pure ethane-1-hydroxy-1,1-diphosphonate as the trisodium salt gives values as follows in the above test:

| pH of test: | g. Ca/100 g. anhyd. $Na_3$ salt |
|---|---|
| 9 | 0.8 |
| 10 | 9.8 |
| 11 | 14.9, 16.1 |
| 12 | 15.8, 16.1 |

Example II

A clear solution was prepared by adding 100 g. (1.22 mols) $HPO_3H_2$ to a mixture of 800 cc. (8.47 mols) $(CH_3CO)_2O$ and 200 cc. (2.81 mols $CH_3COCl$); thus, the reagents were used in the 1.0:6.9:2.3 molar ratio. After 35 minutes of heating at 50° C., this solution became turbid; the turbidity increased rapidly, forming first a gum, changing to a crystalline precipitate within the next 10 minutes. The slurry was digested for 110 minutes longer (total heating time 2 hours and 35 minutes).

The solids were removed from the slurry by filtration and washed free of mother liquor using ethyl ether. The yield of ether-free solid was 103 g. A fresh water solution of these solids shows a $P^{31}$ MR multiplet at —16 p.p.m. (J not measured).

For hydrolysis, 48 g. of the above solids were dissolved in 100 cc. of water and heated at reflux temperature (100–103° C.) for 24 hours. A small sample removed after 6 hours was identical by $P^{31}$ MR analysis to the main hydrolysate, both showing the spectrum characteristic of pure ethane-1-hydroxy-1,1-diphosphonic acid; namely, a quartet centered at delta=—19 p.p.m. with a coupling constant J=16 cps.; a small sample taken after 2 hours of refluxing was only two-thirds hydrolyzed to the desired diphosphonic acid. Therefore, the time required for complete hydrolysis of the aforementioned solid lies between 2 and 6 hours at 100–103° C.

The product from 24 hours of refluxing was concentrated by evaporation to yield 43 g. of a syrupy acid. Upon standing, a portion of this crystallized. The crystals were removed by filtration, washed free of mother liquor with acetone, and dried. The yield was 15.3 g. This crystal fraction was identified as the monohydrate of ethane-1-hydroxy-1,1-diphosphonic acid by X-ray diffraction. Elemental analyses, acid-base titration, and calcium sequestering tests were entirely consistent with this composition. A portion of these crystals dissolved in water gave the $P^{31}$ MR spectrum of ethane-1-hydroxy-1,1-diphosphonic acid identical to that for the hydrolysate above.

Example III

A reaction solution was prepared at room temperature, consisting of 1.22 mols of phosphorus trichloride, 4.50 mols acetic acid, and 7.64 mols of acetic anhydride. The clear solution was heated to 70° C. over a 20-minute period; after 5 minutes at 70° C., the solution became turbid as the acetylated condensate crystallized from solution. During the crystallization, the temperature rose spontaneously to 77° C., then fell slowly back to 70° C., where the temperature was maintained for an additional 90 minutes. The reaction mixture was cooled to room temperature. The solids were removed by filtration and washed free of mother liquor with ethyl ether.

Five (5.0) g. of the solid product were retained for characterization. It was found to be identical to the desired acetylated condensate of ethane-1-hydroxy-1,1-diphosphonic acid by $P^{31}$ and $H^1$ magnetic resonance spectra.

The remaining solid product was dissolved in 200 cc. of water and refluxed (100° C.) for 6 hours. The solution was evaporated to a syrup and redissolved in acetic acid. The solution was again evaporated to a syrup and again redissolved in acetic acid. The ethane-1-hydroxy-1,1-diphosphonic acid was then crystallized from the acetic acid solution at 25–30° C. The solids were removed by filtration; yield 32.6 g. This is equivalent to a 70% yield, when allowance is made for the 5.0 g. of acetylated condensate removed from the system earlier. The product was consistent with pure ethane-1-hydroxy-1,1-diphosphonic acid by both $P^{31}$ and $H^1$ magnetic resonance spectra.

Example IV

The following reagents were added to a 1 liter reaction flask containing 50 g. (0.61 mol) $HPO_3H_2$, 400 cc. (4.23 mols) $(CH_3CO)_2O$ and 100 cc. (1.40 mols) $CH_3COCl$. The mixture was heated to 55° C. and after 30 minutes a precipitate formed in the clear reaction mixture. The temperature was maintained at 55° C. for a total of 2 hours. The solids were removed by filtration, washed free of mother liquor with ethyl ether, and dried in a nitrogen atmosphere:

Solids: 55.2 g. 23.1% C. Atomic C/P. 25.5% P. Ratio 2.35.

The remaining mother liquor was returned to the reaction flask, and the following reagents added: 24.6 g. (0.30 mol) $HPO_3H_2$, 25.8 cc. (0.45 mol) $CH_3COOH$ and 13.1 cc. (0.15 mol) $PCl_3$. The clear solution was heated to 55° C.; after 25 minutes the reaction mixture had formed a precipitate. The temperature was maintained at 55° C. for a total of 2 hours. The solids were removed by filtration, washed free of mother liquor with ethyl ether, and dried in a nitrogen atmosphere:

Solids: 57.2 g. 22.3% C. Atomic C/P. 24.6% P. Ratio 2.34.

The mother liquor was again treated as in the preceding paragraph:

Solids: 53.0 g. 22.6% C. Atomic C/P. 23.1, 23.2% P. Ratio 2.52.

Yields for the three solid products are 75%, 101% and 88%, respectively, based on the content of the product as compared to the phosphorus added at the beginning of each step. The overall yield was 86%, based on the total phosphorus in the three solid products as compared to the total phosphorus in the starting materials.

The procedures described in this example reveal both one set of conditions which, though chosen arbitrarily, is very near the optimum (2nd cycle) for producing high yields of the acetylated intermediate condensate, and another which is slightly removed from the optimum (3rd cycle). Analysis of the mother liquor from the third-cycle by proton magnetic reasonance revealed the presence of appreciable acetic acid in addition to the expected acetyl chloride and acetic anhydride. The acetic acid probably resulted from absorption of moisture from the atmosphere during filtration washing and sample transfers; its presence indicates lower anhydrizing power, which probably led to the slightly lower yield. Avoidance of such moisture absorption and restoration of the C/P/Cl ratio in the reaction mixture would make the yield of the acetylated intermediate nearly quantitative in the third and all subsequent cycles.

In each of the first three preceding examples the mother liquor obtained from the reaction step and the acetic acid obtained from the final recovery step of ethane-1-hydroxy-1,1-diphosphonic acid can be recycled back to the reaction mixture as was done in Example IV and thus be passed through the reaction system repeatedly.

Although the invention has been described with a certain degree of particularity, it is understood that the present disclosure has been made only by way of example and that numerous changes in the details of the process may be resorted to without departing from the spirit and the scope of the invention.

What is claimed is:

1. A process for preparing ethane-1-hydroxy-1,1-diphosphonic acid which comprises the steps of
   (A) preparing a reaction solution comprising phosphorous acid, acetic anhydride, and acetyl chloride in which the molar proportions of these reactants are respectively in the range of from about 1:3:1 to about 1:8:5,
   (B) heating said reaction solution to a temperature in the range of from about 30° C. to about 90° C. for a period of time of from about 5 minutes to about 9 hours until an acetylated intermediate condensate of ethane-1-hydroxy-1,1-diphosphonic acid is formed which precipitates out of the reaction solution,
   (C) filtering said reaction solution to separate said acetylated intermediate condensate and to obtain a mother liquor filtrate composed of the remaining reaction solution,
   (D) hydrolyzing said acetylated intermediate condensate and forming a solution consisting essentially of free ethane-1-hydroxy-1,1-disphosphonic acid and acetic acid.

2. A process according to claim 1 which also includes the step of separating said ethane-1-hydroxy-1,1-diphosphonic acid from said acetic acid following the hydrolyses step.

3. A process according to claim 1 in which the molar proportion of phosphorous acid, acetic anhydride, and acetyl chloride in the starting reaction solution is respectively in the ranges of from 1:4.1:1.5 to 1:7.4:4.6.

4. A process according to claim 1 in which the reaction solution is heated to a temperature of from 50° C. to 80° C. for a period of time of from 10 minutes to 4 hours.

5. A process according to claim 1 in which the hydrolysis step of the acetylated intermediate condensate ethane-1-hydroxy-1,1-diphosphonic acid comprises refluxing an aqueous solution of said condensate for a time period of from about 15 minutes to about 12 hours, within a temperature range of from about 80° C. to about 170° C.

6. A process according to claim 5 in which refluxing is performed in a temperature range of from about 100° C. to about 155° C., for a period of time ranging from about 15 minutes to 6 hours.

7. A process according to claim 1 which is continuous and which includes recycling the mother liquor filtrate obtained from the filtering step by which the acetylated intermediate condensate is separated, and the acetic acid recovered from the hydrolysis step back to the starting reaction solution.

References Cited

UNITED STATES PATENTS 3,214,454  10/1965  Blaser et al.

FOREIGN PATENTS 1,148,551  5/1963  Germany.

LEON ZITVER, *Primary Examiner.*

J. E. EVANS, *Assistant Examiner.*